United States Patent [19]

Shuman

[11] Patent Number: 4,933,126

[45] Date of Patent: Jun. 12, 1990

[54] METHOD AND APPARATUS OF TEMPERATURE CONTROL IN HEAT FORMING OF THERMOPLASTIC SHEET MATERIAL

[76] Inventor: Jack N. Shuman, 3330 Foxcroft Rd., Charlotte, N.C. 28211

[21] Appl. No.: 637,207

[22] Filed: Aug. 3, 1984

[51] Int. Cl.[5] .............................................. B29C 49/64
[52] U.S. Cl. .................... 264/40.6; 264/40.1; 264/553; 264/25; 425/143; 425/526
[58] Field of Search ................. 264/25, 40.6, 40.1, 264/553; 425/143, 526; 219/354, 358

[56] References Cited

U.S. PATENT DOCUMENTS

| | | | |
|---|---|---|---|
| 3,359,600 | 12/1967 | O'Brien et al. | 219/354 X |
| 3,568,253 | 3/1971 | Schwartz et al. | 425/143 |
| 3,865,912 | 2/1975 | Rosenkranz et al. | 264/40.6 |
| 4,391,663 | 7/1983 | Hutter | 219/358 X |
| 4,506,144 | 3/1985 | Hesford et al. | 264/25 X |

FOREIGN PATENT DOCUMENTS

| | | | |
|---|---|---|---|
| 0063462 | 10/1982 | European Pat. Off. | 264/40.6 |
| 2162129 | 6/1973 | Fed. Rep. of Germany | 425/143 |
| 51-39775 | 4/1976 | Japan | 264/40.6 |
| 52-47056 | 4/1977 | Japan | 264/25 |

Primary Examiner—Hubert C. Lorin
Attorney, Agent, or Firm—Shefte, Pinckney & Sawyer

[57] ABSTRACT

An improved temperature sensing and controlling arrangement for incorporation in thermoplastic heat forming systems includes an infrared thermometer operative to sense the temperature of a plastic sheet during its heating and to produce a direct current output in linear proportion to the intensity to the radiation emitted by the sheet, an electrical relay assembly operative to receive the direct current from the thermometer and to energize and de-energize a relay when the value of the direct current is below or at or above a predetermined value corresponding to a predetermined maximum temperature to which the sheet is to be heated, and a programmable microprocessing sequencer operatively associated with the relay assembly and the heating oven to de-energize and energize the oven when the relay is energized and de-energized, respectively. This temperature control arrangement causes alternate energization and de-energization of the oven in rapid cyclical repetition to prevent the sheet from being heated above the predetermined temperature while maintaining the sheet substantially at such temperature.

6 Claims, 1 Drawing Sheet

METHOD AND APPARATUS OF TEMPERATURE CONTROL IN HEAT FORMING OF THERMOPLASTIC SHEET MATERIAL

BACKGROUND OF THE INVENTION

Thermoplastic sheet material is conventionally formed into predetermined contoured configurations for use as the housings for illuminated signs, the shells for whirlpool and bath tubs, and a wide variety of other products. The formation of such products from plastic sheet material is typically achieved by a heating and molding process for which a number of apparatus are presently available. Basically, these apparatus include a heating oven and a table on which the appropriate mold is supported and a frame for engaging the plastic sheet peripherally. One or both of the table and the heating oven are movable with respect to the other for selective disposition of the table outside the oven for loading and within the oven for heating and molding of the plastic sheet material. Relative movement between the sheet engaging frame and the mold is also usually provided for disposition thereof apart from one another during heating of the plastic sheet while within the oven and for movement of the frame and mold toward one another once the sheet reaches a plasticized state for applying the sheet to the mold surface to be conformed to its contour. Most such apparatus additionally provide for the application of vacuum through the mold to the plastic sheet to draw the sheet into complete conformity with the mold surface. Typical examples of the above-described apparatus and methods of forming thermoplastic sheet material are disclosed in U.S. Pat. Nos. 3,553,784; 4,018,551; 4,099,901; and 4,170,449.

Such apparatus and methods have proved satisfactory for the most part for their intended purposes. However, problems do sometimes arise in suitably controlling the degree of heating of the plastic sheet material performed by these apparatus and methods. No manner of thermostatic control of the temperature produced within the ovens to which the sheet material is heated is known to be employed in any of the conventional apparatus and methods of the type described. The apparatus and methods are routinely operated for forming plastic sheets of a variety of different thermoplastic materials, as well as differing sizes, thicknesses and colors of sheets of all such materials. It is a particular concern in the heating of the plastic sheets utilized that the sheet be heated only to the extent necessary to achieve complete plasticization across the full extent of its lateral dimensions and its thickness but without overheating any portion of the sheet material to avoid burning, tearing, separation, over stretching or other undesired deformation of the plastic material out of a generally sheet-like form. As will be understood, the aforementioned variety of sheets utilized in apparatus and methods of the present type necessitate differing degrees of heating of the sheets. Since no thermostatic heater control is provided, the needed control of the heating of the sheet material is conventionally accomplished only by adjusting the time of heating in relation to the pertinent sheet characteristics determining the rate and degree of heating thereof, i.e. the material composition, size, thickness and color of the sheet. Disadvantageously, the lack of thermostatic heater control causes the heating elements of the oven to generate heat at progressively increasing temperatures over the time of energization of the oven. Accordingly, in certain circumstances, particularly when an extended time of heating is required under the conventional practice, the heating control provided by regulation of the heating time may be entirely unsatisfactory in preventing overheating and resultant damage to the sheet material since the temperature in the oven may reach an undesirably high degree because of the extended heating time. It is typical in some apparatus and methods that the heating ovens utilized may cause uneven heating of the sheet material at different areas thereof which only serves to accentuate and compound the above-described problems.

SUMMARY OF THE INVENTION

In contrast, the present invention provides an improved method and apparatus for controlling the temperature to which thermoplastic sheet material is heated in plastic thermoforming methods and apparatus of the basic type above-described. According to the present invention, a predetermined maximum desired temperature is established for the particular sheet material utilized in relation to the composition of the material. During heating of the sheet material, the temperature to which it is heated is sensed by an appropriate sensing arrangement and, when the sheet material is detected to achieve the predetermined maximum temperature, the heating arrangement is alternately stopped and restarted in cyclical repetition. In this manner, the sheet material is maintained substantially at the predetermined temperature for achieving complete plasticization of the sheet material while preventing overheating thereof.

In the preferred embodiment of the present method and apparatus, an infrared radiation detector is utilized to monitor the infrared radiation emitted from the sheet material as a result of its heating and to generate an electrical signal of a current value directly proportional to the intensity of the infrared radiation. An electrical relay is associated with the infrared detector to receive its electrical signal and is operative to be maintained in a normal open condition when the current value of the signal is less than, and to move to a closed condition when the current value of the signal equals or is greater than, the current value corresponding to the infrared radiation intensity emitted by the sheet material at the predetermined maximum temperature. The heating arrangement is operated in relation to the condition of the electrical relay such that the heating arrangement is energized when the relay is in its normal open condition and de-energized when the relay is in its closed condition.

Preferably, the repetitive cyclical stopping and restarting of the heating arrangement, once initiated, is carried out for a predetermined period of time selected in relation to the pertinent heating characteristics of the sheet material for achieving complete plasticization thereof. It is also preferred that the heating arrangement be adapted to independently heat designated generally distinct zones of the sheet material so that all areas of the sheet material can be equally and evenly heated. The several zones of the heating arrangement are actuated in sequence rather than simultaneously to prevent undesired power surges on the power source.

DESCRIPTION OF THE PREFERRED EMBODIMENT

Figure 1:
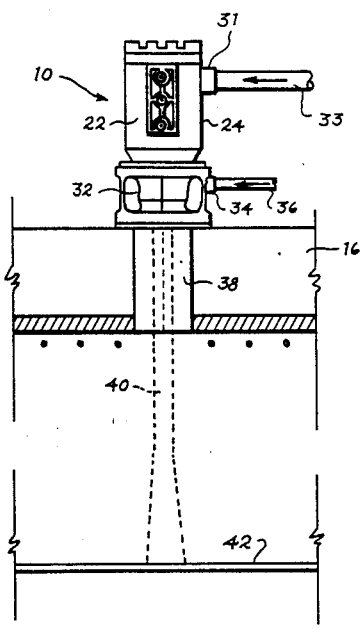
FIG. 1 is a vertical cross-sectional view taken through the heating oven of a plastic forming apparatus of the type to which the present invention relates, showing the temperature sensing arrangement of the present invention.

For purposes of providing a complete enabling disclosure to those persons skilled in the art, the present temperature control apparatus and method is herein described and illustrated as preferably embodied in a plastic forming method and apparatus of the particular type wherein is provided a stationary heating oven having electrically-operated heating elements elevated in a horizontal position on supporting legs and a forming table mounted on rollers for floor-supported rolling movement between a plastic sheet mounting and demounting position spaced outwardly from beneath the oven and a heating position directly beneath the oven. The oven is of the conventional type without thermostatic control operative to generate heat at progressively increasing temperatures over the time of operation. The forming table as a central horizontal surface area providing a supporting bed on which selected mold assemblies may be positioned and also includes a rectangular clamping frame adapted to engage and hold the peripheral edges of plastic sheet material, the clamping frame being supported in horizontal disposition on a scissors-type linkage for selective vertical movement toward and away from the bed. A suitable mold assembly utilized with the plastic forming apparatus and method is hollow with a contoured molding surface which is permeable to air and is connected with a suitable vacuum source for the selected application of suction internally of the molding assembly for creating a suction air flow inwardly through the molded surface.

In operation of the plastic forming method and apparatus, the table is initially disposed outwardly in its mounting and demounting position, a selected molding assembly is positioned on the bed of the table, and the clamping frame is positioned at an elevated location above the bed and loaded with a selected plastic sheet. The table is then rolled to its heating position in the oven directly beneath the heating elements with the clamping frame still raised to be disposed adjacent the heating elements and the oven is energized to heat the plastic sheet into a plasticized state. Thereupon, the clamping frame is lowered to drape the plasticized sheet over the molding assembly and the vacuum source is actuated to apply suction through the mold to draw the plasticized sheet into proper conformity with the molding surface. Thereafter, the table is rolled outwardly to return it to its mounting and demounting position and the plastic sheet is permitted to cool and is then removed from the molding assembly.

In the described respects, the plastic forming apparatus and method forms the basis and the environment for the improved temperature control method and apparatus of the present invention but otherwise forms no part of the present invention. The above-described plastic forming methods and apparatus are conventional and well known in structure and operation and, accordingly, it is not necessary that such apparatus and method be more fully described and explained herein. Particular examples of such plastic forming methods and apparatus are disclosed and illustrated in the aforementioned U.S. Pat. Nos. 3,553,784; 4,018,551; 4,099,901; and 4,170,449, each of which is hereby incorporated herein by reference and to each of which further reference may be had for a more complete description and understanding of such apparatus and methods.

It is to be understood that a number of other basic types of conventional forming apparatus and methods exist. For example, plastic forming apparatus and methods exist which use stationary elevated heating ovens of the above-described type wherein the molding assembly is maintained outside the oven and is movable only vertically and the sheet retaining frame is movable only laterally into and out of the oven. As those persons skilled in the art will readily recognize, the temperature control apparatus and method of the present invention is adapted to be retrofitted or included as original equipment not only in plastic forming methods and apparatus of the type described above in detail, but also in any other plastic forming apparatus and method wherein heated plasticization of thermoplastic sheet material is performed.

It is preferred that the oven of the plastic forming apparatus and method in which the present invention is incorporated be of the conventional type having its heating elements arranged in a plurality of coplanarly arrayed heating panels which are independently operable. As is conventional, individual ones or any combination of some or all the plural panels may be energized in a given application of the apparatus and method for properly heating plastic sheets of varying sizes and shapes.

Referring now to the accompanying drawings, the temperature control apparatus and method of the present invention basically provides and utilizes three primary components. A temperature sensing arrangement, indicated generally at 10, is provided for sensing and detecting changes in the temperature of the thermoplastic sheet material during its heating. A switching arrangement, indicated generally at 12, is provided for monitoring the temperature sensing arrangement and is adapted to be selectively set up according to a predetermined desired maximum temperature to which the sheet is to be heated so that the switching arrangement will be in an open condition when the sensed temperature is less than the predetermined temperature and will be in a closed position when the sensed temperature is equal to or greater than the predetermined temperature. A programmable microprocessor arrangement, indicated generally at 14, is operatively associated with the switching arrangement 12 and with the oven 16 for energizing the heating elements of the oven 16 when the switching arrangement 12 is open and for de-energizing the heating elements when the switching arrangement 12 is closed. The various components of the temperature control apparatus and method are operated and connected electrically by an electrical circuit arrangement, indicated generally at 18, which includes a conventional terminal board 20.

The temperature sensing arrangement 10 preferably includes an infrared thermometer 22 of the type having an infrared detector (not shown) adapted to detect infrared radiation and to generate an electrical signal that varies in direct proportion to the intensity of the detected radiation. One example of such an infrared thermometer conventionally available and which is preferably utilized in the present invention is manufactured by Ircon, Inc., of Skokie, Ill., under the trademark MODLINE 4. This infrared thermometer 22 includes a conventional infrared detector of the above-indicated type and an optical lens (not shown) mounted in operative association in a generally cylindrical housing 24 to be exposed at one end thereof such that the housing 24 may be arranged with the lens facing a source of radiant heat energy and to focus the resultant infrared radiation on the infrared detector. Positive and negative terminals 26,28 are provided for connection of the thermometer in a line of direct electrical current and appropriate electrical circuitry (not shown) provides a complete direct current line between the terminals 26,28 and is operatively connected with the detector to receive its generated signal and to amplify, linearize and scale the electrical signal to a predetermined temperature range to produce a resultant output of direct electrical current which varies linearly in proportion to the intensity of the infrared radiation sensed. A ground terminal 29 provides for grounded connection of the thermometer 22 to earth. An opening 31 in the housing 24 is provided to accept a cable 33 or other electrical wiring for achieving the indicated connections of the terminals 26,27,28. A potentiometer (not shown) having an operating dial 30 is provided for adjusting the electrical circuitry to provide variations in the time taken by the circuitry to respond to sensed temperature changes and to produce corresponding changes in the direct current output.

The infrared thermometer 22 includes an air circulating sleeve 32 affixed co-axially with the housing 24 at the end thereof at which the lens is exposed and includes an opening 34 for connection with a suitable conduit 36 to receive a moving airstream and to direct it into and through the sleeve for preventing the accumulation of debris on the lens and for maintaining the lens relatively cool. The thermometer 22 is mounted by its sleeve 32 on a cylindrical supporting sleeve 38 which extends centrally through the elevated heating oven 16. In this manner, the lens of the thermometer 22 faces downwardly to the center of the bed of the forming table to provide a circular optical site area 40 on the plastic sheet.

The temperature sensing arrangement 10 also includes a digital display and power supply unit, indicated generally at 44, in operative association with the thermometer 22. The display and power supply unit 44 includes a pair of terminals 46,48 for operational connection to an appropriate power source of alternating electrical current, includes an appropriate arrangement to convert the alternating current to direct current, and includes positive and negative terminals 50,52, as well as an associated ground terminal 54, for electrical connection in a complete direct electrical current circuit loop with the thermometer 22 to supply the converted direct current thereto and to receive the direct current output therefrom to produce a digital display of the temperature value in the scale of the predetermined temperature range established by the circuitry of the thermometer 22 to which its prevailing output current corresponds. The display and power supply unit is also manufactured by Ircon, Inc., under the model designation IDP-4 as a companion unit to the infrared thermometer MOD-LINE 4.

The switching arrangement 12 preferably includes an electrical relay assembly 56 operable to monitor a line of direct electrical current and to be energized to an open condition or de-energized to a closed condition in relation to the amount of the direct current. One example of such an electrical relay assembly conventionally available and which is preferably utilized in the present invention is manufactured by Moore Industries Incorporated, of Sepulveda, Calif. under the trade designation "DC Current Alarm," Model #DCA/42-0mA/SX1/117AC. Basically, this preferred electrical relay assembly 56 includes an electrical relay switch 57 of the conventional type having a common terminal 58 and a pair of input or output terminals 60,62 which are alternately connectible electrically with the common terminal 58 in relation to the value of a line of operating direct electrical current to which the relay 57 is connected by positive and negative terminals 64,66. The electrical relay assembly 56 includes positive and negative terminals 68,70 for connection in a line of direct electrical current and includes electrical circuitry, indicated only representatively at 72, which completes a direct current line between the terminals 68,70 through and including the terminals 64,66 of the relay 57 for operation thereof. A ground terminal 71 provides grounding of the electrical relay assembly 56 to earth. The electrical circuitry 72 is powered by a source of alternating electrical current to which the circuitry 72 is operatively connected by a pair of alternating current terminals 74,76. The electrical circuitry 72 includes a pair of printed circuit boards (not shown) which operate essentially to monitor the value of the direct current through the circuitry 72 and to maintain the relay 57 energized in an open condition wherein the common and alternate terminals 58,60 are operatively connected so long as the value of the direct current is less than a predetermined value and to de-energize the relay 57 to a closed condition wherein the common and alternate terminals 58,62 are operatively connected whenever the value of the direct current equals or exceeds the predetermined value. An adjustment potentiometer (not shown) is provided in the electrical circuitry 72 and has an operating dial 78 exposed on the exterior of the housing of the electrical relay assembly 56 for permitting selective predetermination and variation of the direct current value for operating the relay 57. The electrical relay assembly 56 also includes an internal bell 80 having a pair of alternating current terminals 82,84, one terminal 82 of which is electrically connected by a line 85 with the terminal 62 of the relay 57. The common terminal 58 of the relay 57 and the other terminal 84 of the bell 80 may therefore be electrically connected with the leads from a source of alternating electrical current for providing a complete alternating current circuit line through the relay 57 and the bell 80 upon de-energization of the relay 57 to energize the bell 80 to provide an audible alarm whenever the direct current being monitored by the electrical relay assembly 56 reaches or exceeds the predetermined value.

Figure 2:
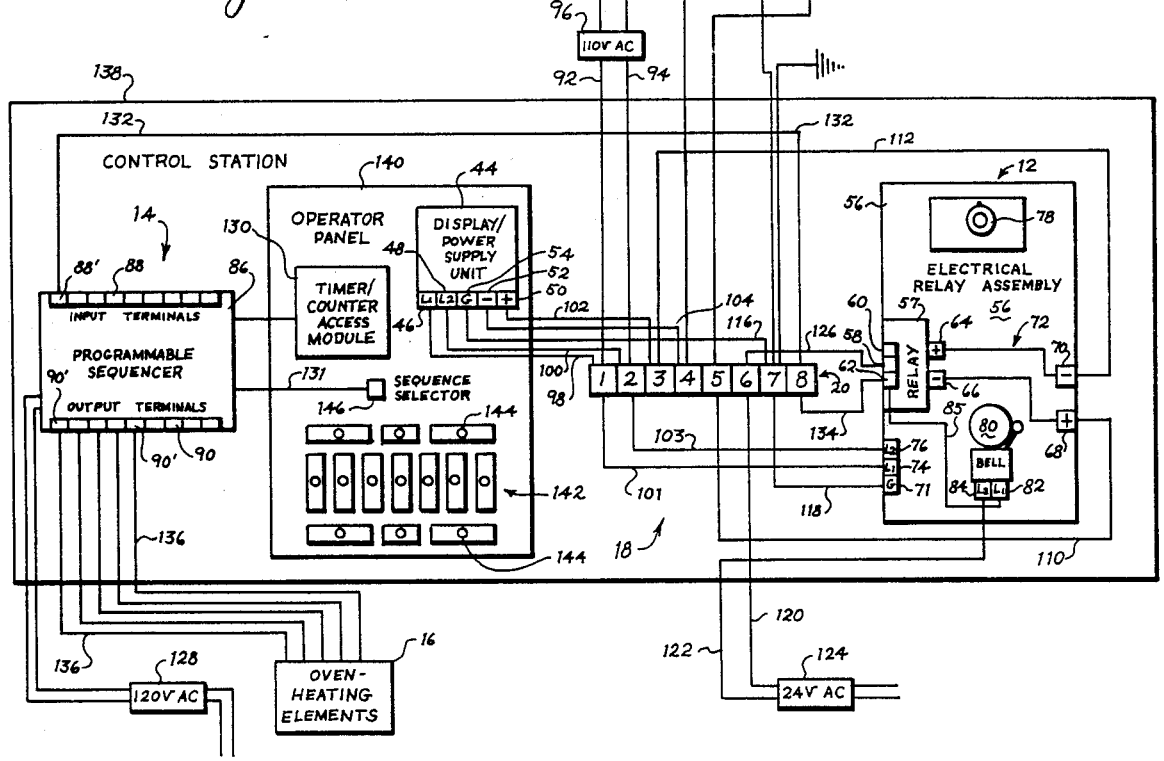
FIG. 2 is a schematic electrical diagram of the improved temperature control apparatus of the present invention.

The electrical diagram of FIG. 2 shows schematically the particular electrical connection of the temperature sensing arrangement 20 and the switching arrangement 12. As previously mentioned, the electrical connections between these components are made through the terminal board 20 which has at least 8 available connecting terminals which are numerically designated herein by the numerals 1-8 and are correspondingly labeled in the diagram of FIG. 2 to best facilitate the understanding of this disclosure. Terminals 1 and 2 are respectively connected to the ungrounded or "hot" ($L_1$) lead 92 and to the common or neutral ($L_2$) lead 94 from a source 96 of 110 volt alternating electrical current. Terminals 1 and 2 are, in turn, also electrically connected by leads 98,100 to the alternating current power supply terminals 46,48 of the display and power supply unit 44 and by leads 101,103 to the alternating current power supply terminals 74,76 of the electrical relay assembly 56. The opposed positive and negative direct current terminals 50,52 of the display and power supply unit 44 are connected by leads 102,104 to terminals 3 and 4, respectively. Terminal 4 is connected by a lead 106 with the direct current terminal 26 of the infrared thermometer 22. The other terminal 28 of the infrared thermometer 22 is electrically connected by a lead 108 to the terminal 5. Terminal 5 is, in turn, also connected by a lead 110 to the direct current terminal 68 of the electrical relay assembly 56. The other direct current terminal 70 of the electrical relay assembly 56 is electrically connected by a lead 112 to terminal 3. Each of the ground terminals 29,54, and 71 of the infrared thermometer 22, the display and power supply unit 44 and the electrical relay assembly 56 are electrically connected by respective leads 114,116,118 to terminal 7 which, in turn, is electrically grounded to earth.

It will therefore be recognized that a complete, closed direct current circuit loop is provided through the display and power supply unit 44, the infrared thermometer 22 and the electrical relay assembly 56. In operation, the display and power supply unit 44 converts the operating alternating current from the source 96 into direct current which is conducted through terminal 52, lead 104, terminal 4, lead 106 and terminal 26 to and through the electrical circuitry of the infrared thermometer 22. The circuitry of the thermometer 22 modifies the direct current received in relation to the signal produced by the infrared detector to produce a output direct current the value of which is proportional to the intensity of infrared radiation sensed by the thermometer 22 and therefore representative of the temperature of the sheet 42 being monitored. This direct current output of the infrared thermometer 22 is conducted through terminal 28, lead 108, terminal 5, lead 110 and terminal 68 into and through the electrical circuitry 72 of the electrical relay assembly 56. The electrical circuitry 72 operates to energize the relay to electrically connect its common and alternate terminals 58,60 when the value of the direct current is below a preset value determined by the potentiometer in the circuitry 72 and, alternately, to electrically connect the common and alternate terminals 58,62 of the relay 57 when the value of the direct current exceeds the predetermined value. The direct current is conducted from the circuitry 72 through the terminal 70, the lead 112, the terminal 3, and the terminal 50 of the display and power supply unit 44, the electrical circuitry of which produces a digital display representing the sensed temperature of the object being monitored by the infrared thermometer 22.

The hot (L$_1$) lead 120 of an independent source 124 of 24 volt alternating electrical current is electrically connected to the terminal 6 which, in turn, is electrically connected by lead 126 to the common terminal 58 of the relay 57. The neutral (L$_2$) lead 122 of the alternating current source 124 is electrically connected to the terminal 84 of the bell 80. As will thus be understood, when the value of the direct current conducted through the electrical circuitry 72 of the electrical relay assembly 56 meets or exceeds the predetermined value set by the potentiometer thereby causing the terminals 58,62 of the relay to be electrically connected, an alternating current circuit is completed through the bell 80 to energize it to sound an audible alarm indicating the attainment of the predetermined current value and the resultant de-energization of the delay 57.

The microprocessor arrangement 14 includes a microprocessing unit 86 of the type commonly known as a programmable sequencer which has plural input and output terminals 88,90 by which the sequencer can be operatively connected with a number of machines, electrical devices and the like to control their sequence, timing and length of operation. One example of such a programmable sequencer conventionally available and which is preferably embodied in the present invention is manufactured by Texas Instruments Incorporated, of Dallas, Tex., under the model designation 5TI-1030 Series Sequencers. This programmable sequencer 86 is operated by a source 128 of 120 volts alternating electrical current and includes appropriate memory circuitry, having a plurality of timers or counters, which are operatively connected between the input and output terminals and are selectively programmable to determine the sequence, timing and length of actuating signals delivered to the output terminals to actuate operation of the associated machines or devices.

The microprocessor arrangement also includes an access device 130 electrically connected with the programmable sequencer 86 by a cable system 131 to permit selective adjusting access to the memory circuitry to program the timing or counting functions of the various timers. Such an access device as preferably embodied in the device is also manufactured by Texas Instruments Incorporated under the model designation 5TI3201 "Timer/Counter Access Module." For programming purposes, each timer in the memory circuitry of the sequencer 86 is designated by an assigned number and the length of operation of each timer is similarly assigned a numerical value representing the predetermined length of time of its operation. The access device 130 includes two digital displays operative to show the assigned number of the timer to which access is available and to show the preset or current value of the accessed timer. Appropriate push button switches are also provided by which an operator can selectively obtain the digital display representing any given timer by its assigned number and the preset numerical value thereof to obtain the predetermined length of operation of the associated controlled function or the current relative point at which the function is then in carrying out its predetermined length of operation. The push button switches further permit selective resetting of the numerical timed value of any timer. A key-operated security lock is provided to prevent programming access to the memory circuitry in a locked position and to permit such programming access in an unlocked position of the security lock.

As preferably embodied in the present invention, one input terminal 88' of the programmable sequencer 86 is operatively connected to the terminal 62 of the relay 57 by a first lead 132 between the terminal 88' and the terminal 8 and a second lead 134 from the terminal 8 to the relay terminal 62. In this manner, when the relay 57 is de-energized to its closed condition wherein the terminals 58 and 62 are electrically connected, an electrical signal will be conducted through the leads 134 and 132 to the sequencer 86 to register the de-energized condition of the relay 57. The sequencer 86 is also electrically connected with the various heater panels of the oven 16 by one or more output terminals 90' through one or more corresponding leads 136 to the electrical circuitry of the heater panels. The memory circuitry of the sequencer 86 is programmed to monitor the energized or de-energized condition of the relay 57 as represented by the occurrence or non-occurrence of a signal as described through the leads 132,134 and to operate through its appropriate output terminals 90' to energize the heater panels when the relay 57 is energized to its open condition and to de-energize the heater panels when the relay 57 is de-energized to its closed position.

As will thus be understood, the described operative relationship between the electrical relay assembly 56, the sequencer 86 and the oven 16 is effective to produce a repetitive cyclical energization and de-energization of the heating panels of the oven 16. As previously explained, the de-energization of the relay 57 occurs when the current value received by the electrical relay assembly from the infrared thermometer 22 exceeds a predetermined value. Since the direct current output of the infrared thermometer varies in linear proportion to the temperature sensed thereby, the predetermined value at which the relay 57 de-energizes is representative of a given temperature value sensed by the infrared thermometer 22. Furthermore, since the sequencer 86 is operative to energize the oven 16 when the relay 57 is energized and to de-energize the oven 16 when the relay 57 is de-energized, the oven 16 is effectively prevented from heating to temperatures above the given temperature to which the predetermined current value set by the electrical relay assembly 56 corresponds. Furthermore, as a necessary result of any de-energization of the oven 16, the temperature therewithin will begin to fall. In turn, the intensity of the infrared radiation sensed by the infrared thermometer 22 and the resultant direct current output produced thereby will be correspondingly reduced. As soon as the direct current output from the infrared thermometer 22 falls below the current value preset in the electrical relay assembly 56, representing a reduction in the temperature sensed by the thermometer 22 below the threshold temperature at which the relay 57 de-energizes, the relay 57 will be re-energized and, in turn, the sequencer 86 will re-energize the oven 16. Thereupon, the described cycle will repeat with the relay 57 and the oven 16 being again de-energized and then again re-energized. In this manner, the relay-controlled repetitive energizing and de-energizing of the oven 16 is effective to maintain the temperature produced by the oven substantially at the threshold temperature determined by the relay assembly 56 at which the relay 57 de-energizes.

It will thus be understood that the first occurrence of the de-energization of the relay 57 and, in turn, of the heater panels of the oven 16 in any operation of the present invention will represent the attainment by the plastic sheet of the temperature determined by the presetting of the electrical relay assembly 56. In many applications, it may be desirable that the sheet material be maintained at such temperature for a predetermined period of time for continued heating of the sheet at such temperature, while in other instances it may be desirable to proceed immediately to mold the sheet material. To provide such selective control, one or more timers in the sequencer 86 are assigned to be actuated upon the first de-energization of the relay 57 to permit selective presetting of the length of time, if any, an energizing signal from the sequencer 86 will continue to be available through the output terminals 90' to the heater panels of the oven 16 after the first relay de-energization occurs. In this manner, the sequencer 86 may be selectively programmed through the access unit 130 to control the repetitive cycling de-energization and re-energization of the oven 16 for any predetermined length of time following the attainment of the sheet of the preset temperature determined by the electrical relay assembly 56 or, alternatively, to prevent any further energization of the oven 16 thereupon.

Preferably, each heater panel of the oven 16 is connected independently with a different output terminal and a different timer is assigned to each heater panel so that the above-mentioned timed operation of the heater panels may be controlled individually to permit selective varying of the time period of operation of each heater panel as may be desired. Additionally, the memory circuitry of the sequencer 86 is preferably programmed to cause the individual heater panels to be energized in relatively quick sequence to one another upon any energization of the oven 16 as determined by the condition of the relay 57 so that a gradually increasing electrical power requirement is produced upon energization of the oven 16. In this manner, surges of large magnitude in the electrical power usage of the oven 16, for which utility companies levy significant surcharges, are prevented and thereby considerable savings in the energy cost of operation of the oven 16 are realized.

It is also preferred that all of the other operating components of the forming apparatus, including the operating motor for moving the clamping frame upwardly and downwardly relative to the table and the vacuum pump by which suction is applied internally to the molding assembly as well as any other mechanized components and operations of the apparatus, are also operatively connected with the sequencer 86 by appropriate input and output terminals thereof and are assigned respective timers for control of the sequence and timing of their operation. The memory circuitry of the sequencer 86 is programmed to control the energization of the oven and all such other operating components of the apparatus in proper timed sequence in conformity to the conventional method of their operation.

The sequencer 86, its access unit 130, the display and power supply unit 44 and the electrical relay assembly 56 are all contained within a single housing 138 forming an operator control station. The sequencer access unit 130 and the display and power supply unit 44 are mounted on an exterior panel 140 of the housing 138 for ready access thereto by an operator to monitor the operation of the present apparatus and method from the digital displays these units provide as well as to provide ready programming access to the sequencer 86. The operator panel 140 also includes a schematic representation of the arrangement of the heater panels of the oven 16, as indicated at 142, with a light 144 being provided to represent each heater panel and being operative to be illuminated when the respective heater panel is energized.

In the operation of the present invention, the forming apparatus is initially set up for operation in the usual manner by positioning the forming table out from the oven 16, arranging a selected mold assembly on the table bed, positioning the clamping frame at the desired elevation above the table bed, and loading a plastic sheet 42 into the clamping frame. The dial 78 of the electrical relay assembly 56 is set to adjust the direct current value at which the circuitry 72 will de-energize the relay 57 to correspond to the current value which is produced by the infrared thermometer 22 when sensing the predetermined maximum temperature to which it is desired the plastic sheet 42 should be heated. As will be understood by those persons skilled in the art, such temperature is selected with respect to various characteristics of the particular sheet which have an effect upon its heating, e.g. the particular material composition of the plastic sheet, its thickness, size and color, for purposes of obtaining complete plasticization of the sheet material without causing damaging deformation thereof as a result of overheating. The potentiometer dial 30 of the infrared thermometer 22 may also be adjusted to provide a relatively short response time of the thermometer 22 to temperature changes, this adjustment ordinarily being necessary only in the initial set up of the present apparatus. The access device 130 may be unlocked for programming access to the memory circuitry of the sequencer 86 to set the timers for the oven heater panels to determine which panels will operate and the time period, if any, over which the afore-described energization and de-energization of each heater panel will be cycled to maintain the sheet at its predetermined temperature. As will be understood, the various heater panels may be thusly set for different time periods of operation as may be necessary or desirable in a particular application. The time periods for which the heater panels are set to operate are selected accordingly to essentially the same parameters of the sheet material mentioned above, i.e. material composition, thickness, size and color for the same purpose of insuring complete plasticization of the sheet material. The timers associated with the other apparatus components and functions may also be preset as desired.

Following such preliminary steps, the table is rolled into the oven 16 to be directly beneath the heater panels and the sequencer 86 is actuated to begin the automatic operation of the apparatus by initially energizing the heater panels to begin the heating of the plastic sheet material. As is conventional, the heater panels are operative to produce heat at a progressively increasing temperature which, in turn, causes the plastic sheet 42 to be heated to progressively increasing temperatures. The infrared thermometer 22 is operative to sense the increasing temperature of the sheet material 42 as it becomes heated and converts the direct current input from the display and power supply unit 44 into a correspondingly increasing direct current output. During such initial heating of the sheet material, the relay 57 will be energized to its open condition. When the infrared thermometer 22 detects that the sheet material 42 has been heated to the predetermined maximum desired temperature, the thermometer 22 produces a direct current output equal to or greater than the preset current value of the relay assembly 56. Thereupon, the relay 57 will be de-energized to its closed position, bringing its common and alternate terminals 58,62 into electrical connection and producing a signal to the sequencer 56 as well as completing a circuit through the bell 80 to provide an audible alarm. The sequencer 56 immediately de-energizes the heater panels of the oven 16 and starts each heater panel timer. If the heater panel timers are set at zero, the sequencer 56 will immediately actuate the next step in the plastic forming process by energizing the clamping frame motor to lower the frame about the mold assembly to drape the plasticized sheet material thereover and then to energize the vacuum source to draw suction through the mold assembly for a predetermined time to draw the plastic material into complete conformity with the mold assembly. If a predetermined temperature maintenance time has been programmed to the heater panel timers, the sequencer 86 will maintain an operating signal available to the heater panels. The de-energization of the heater panels permits the heat in the sheet material 42 to begin to dissipate. As the sheet material temperature begins to reduce, the infrared thermometer 22 senses the reducing temperature and produces a correspondingly decreasing direct current output. As soon as the direct current output from the infrared thermometer 22 falls below the preset current value of the relay assembly 56, the relay 57 will re-energize to its open condition, removing the signal to the sequencer 86 which then re-energizes the heater panels of the oven 16 and also breaking the circuit through the bell 80 to de-energize it. For the duration of the preset time periods determined by the individual heater panel timers in the sequencer 86, the energization and de-energization of the relay and the heater panels will repeat cyclically as rapidly as the heat dissipation rate of the sheet material 42 and the preset response time of the infrared thermometer 22 permit and thereby maintain sufficient heating of the sheet material to maintain its temperature substantially at the predetermined maximum temperature. Once the timed duration of the heater panels as set by their sequencer timers is completed, the sequencer 86 will then actuate the movement of the clamping frame and the energization of the vacuum source as previously described.

As desired, the temperature control apparatus of the present invention may be operated with the sequencer 56 de-actuated. In such case, the repetitive cyclical energization and de-energization of the relay and, in turn of the heater panels of the oven 16 will continue indefinitely in precisely the manner described above, with the sequencer 86 essentially functioning only as a lead in conjunction with the leads 132,134,136 to conduct to the oven 16 the signal produced by the relay 57 upon its de-energization which signal is effective in this condition of operation of the present apparatus to de-energize the oven heater panels. In this manner of operation of the present invention, the final de-energization of the heater panels of the oven 16 and the actuation of the other components and operations of the forming apparatus are all performed manually in the conventional manner.

As previously mentioned, other basic types of plastic forming apparatus and methods exist and, in addition, the same apparatus as herein particularly described may be employed in different sequences of operation. The program of the sequencer 86 is provided with the memory capability for controlling a wide variety of operational sequences for the most conventional plastic forming methods on various types of conventional apparatus. A manual dial switch 146 is provided on the control panel 140 and is operatively connected with the sequencer 86 for calling into operation any one of the particular control sequences for which the sequencer 86 is programmed. As will be understood, virtually limitless other control sequences may also be programmed into the sequencer 86 as desired, in substantially each of which sequences the cyclical temperature control of the plastic sheet temperature may be provided. The foregoing disclosure describes one such representative sequence but the present invention is not so limited.

The particular program or programs for controlling the above-described operation will also be apparent in light of the foregoing disclosure to those persons skilled in the art, particularly those familiar with the Texas Instruments, Inc. 5TI 1030 Series Sequencers. Therefore, it is unnecessary to disclose herein the particular program utilized in the present invention. Furthermore, various other sequencers and microprocessors and various other possible programs may be utilized to accomplish the desired operation described, all of which are considered to be within the scope of the present invention.

The present invention has been described in detail above for purposes of illustration only and is not intended to be limited by this description or otherwise to exclude any variation or equivalent arrangement that would be apparent from, or reasonably suggested by, the foregoing disclosure to the skill of the art.

I claim:

1. In a method of forming thermoplastic sheet material into a predetermined contoured configuration including the step of heating said sheet material to a plasticized state, the improvement comprising controlling the temperature of said sheet material during said heating by sensing the temperature of said sheet material during said heating and, upon the sensing of a predetermined maximum desired temperature of said sheet material, alternately stopping said heating upon each said sensing of said predetermined temperature and re-starting said heating upon each said sensing of substantially any temperature lower than said predetermined temperature in relatively rapid cyclical repetition to maintain said sheet material substantially constantly at said determined temperature for soaking said sheet material with heat at said predetermined temperature to achieve complete plasticization of said sheet material while preventing overheating thereof, and said heating includes independently heating designated generally distinct zones of said sheet material, each said re-starting said heating including starting said heating of said zones in a predetermined sequence.

2. In a method of forming thermoplastic sheet material into a predetermined contoured configuration including the step of heating said sheet material to a plasticized state, the improvement comprising controlling the temperature of said sheet material during said heating by sensing the temperature of said sheet material during said heating and, upon the sensing of a predetermined maximum desired temperature of said sheet material, alternately stopping said heating upon each said sensing of said predetermined temperature and re-starting said heating upon each said sensing of substantially any temperature lower than said predetermined temperature in relatively rapid cyclical repetition to maintain said sheet material substantially constantly at said predetermined temperature for soaking said sheet material with heat at said predetermined temperature to achieve complete plasticization of said sheet material while preventing overheating thereof, and said stopping and starting is continued for a predetermined period of time selected in relation to the material composition, thickness and color of said sheet material for achieving complete plasticization thereof, and said heating includes independently heating designated generally distinct zones of said sheet material, each said re-starting said heating including starting said heating of said zones in a predetermined sequence.

3. In a method of forming thermoplastic sheet material into a predetermined contoured configuration including the step of heating said sheet material to a plasticized state, the improvement comprising controlling the temperature of said sheet material during said heating by sensing the temperature of said sheet material during said heating and, upon the sensing of a predetermined maximum desired temperature of said sheet material, alternately stopping said heating upon each said sensing of said predetermined temperature and re-starting said heating upon each said sensing of substantially any temperature lower than said predetermined temperature in relatively rapid cyclical repetition to maintain said sheet material substantially constantly at said predetermined temperature for soaking said sheet material with heat at said predetermined temperature to achieve complete plasticization of said sheet material while preventing overheating thereof, and said stopping and starting is continued for a predetermined period of time selected in relation to the material composition, thickness and color of said sheet material for achieving complete plasticization thereof, and said heating includes independently heating designated generally distinct zones of said sheet material, each said re-starting said heating including starting said heating of said zones in a predetermined sequence, and said sensing includes detecting the intensity of infrared radiation emitted by said sheet material as a result of said heating, said stopping and starting including monitoring said sensing and causing said stopping and re-starting in respective response to the detection of intensities of said infrared radiation equal to and greater than the intensity of said infrared radiation emitted by said sheet material at said predetermined temperature and less than the intensity of said infrared radiation emitted by said sheet material at said predetermined temperature.

4. In an apparatus for forming thermoplastic sheet material into a predetermined contoured configuration, said apparatus comprising means for heating said plastic material to a plasticized state, the improvement comprising means for controlling the temperature of said sheet material during said heating, said temperature controlling means including means for sensing the temperature of said sheet material during said heating and means operatively associated with said sensing means for alternately stopping and re-starting said heating means in relatively rapid cyclical repetition upon the sensing of a predetermined maximum desired temperature of said sheet material by said sensing means for maintaining said sheet material substantially constantly at said predetermined temperature for soaking said sheet material with heat at said predetermined temperature to achieve complete plasticization of said sheet material while preventing overheating thereof, said stopping and re-starting means being operative to cause said stopping of said heating means upon each said sensing of said predetermined temperature and to cause said re-starting of said heating means upon each said sensing of substantially any temperature lower than said predetermined temperature, and said heating means includes plural independently operable heating zones of said sheet material, said stopping and re-starting means including means for starting said heating zones in a predetermined sequence.

5. In a method of forming thermoplastic sheet material into a predetermined contoured configuration comprising the steps of providing heating means adapted to generate heat at temperatures progressively increasing over the time of energization of said heating means, providing a mold of said predetermined configuration, engaging said sheet material at the peripheral edges thereof by a retaining frame, exposing said sheet material to said heating means for heating said sheet material to a plasticized state, moving at least one of said mold and said retaining frame relative to the other to apply said plasticized sheet material to said mold and applying vacuum through said mold to said plasticized sheet material to draw it into conformity with said mold, the improvement comprising closely controlling the temperature to which said sheet material is heated during said exposing to said heating means, said controlling including establishing a predetermined desired maximum temperature to which said sheet material is to be heated, sensing the temperature of said sheet material during said heating by gathering infrared radiation emitted from said sheet material as a result of the heating thereof and generating an electrical signal of a current value directly proportional to the intensity of said infrared radiation, operating an electrical relay means with said electrical signal to maintain said relay means in a normal open condition when the current value of said electrical signal is less than, and to move said relay means to a closed condition when the current value of said electrical signal equals or is greater than the current value corresponding to the infrared radiation intensity emitted by said sheet material at said predetermined temperature, and operating said heating means in relation to the condition of said relay means including energizing said heating means when said relay means is in its normal open condition and de-energizing said heating means when said relay means is in its closed condition for causing said energizing and de-energizing said heating means to relatively rapidly occur alternately and repetitively when said sheet material is at said predetermined temperature to maintain said sheet material substantially constantly thereat, said operating said heating means continuing for a predetermined period of time following the first de-energizing said heating means, thereby to achieve complete plasticization of said sheet material while preventing overheating thereof, and said heating means includes a plurality of distinct and individually actuable heating zones for independently heating designated generally distinct zones of said sheet material, each said energizing said heating means including energizing said heating zones individually in a predetermined sequence.

6. In an apparatus for forming thermoplastic sheet material into a predetermined contoured configuration comprising a mold of said predetermined configuration, a retaining frame for engaging sheet material at the peripheral edges thereof, means for heating said sheet material to a plasticized state, said heating means being adapted to generate heat at temperatures progressively increasing over the time of energization of said heating means, means for moving at least one of said mold and said retaining frame relative to the other to apply said plasticized sheet material to said mold and vacuum means operative through said mold to draw said plasticized sheet material into conformity with said mold, the improvement comprising means for closely controlling the temperature to which said sheet material is heated by said heating means substantially at a predetermined desired maximum temperature, said controlling means including means for sensing the temperature of said sheet material, said sensing means including means for gathering infrared radiation emitted from said sheet material as a result of the heating thereof and for generating an electrical signal of a current value directly proportional to the intensity of said infrared radiation, electrical relay means operatively associated with said sensing means to receive said electrical signal and to be maintained in a normal open condition when the current value of said electrical signal is less than, and to move to a closed condition when the current value of said electrical signal equals or is greater than, the current value corresponding to the infrared radiation intensity emitted by said sheet material at said predetermined temperature, and means for operating said heating means in relation to the condition of said relay means for energizing said heating means when said relay means is in its normal open condition and for de-energizing said heating means when said relay means is in its closed condition for causing the energizing and de-energizing of said heating means to relatively rapidly occur alternately and repetitively when said sheet material is at said predetermined temperature to maintain said sheet material substantially constantly thereat, said operating means being adapted for continuing the energizing and de-energizing of said heating means for a predetermined period of time following the first de-energizing of said heating means, thereby to achieve complete plasticization of said sheet material while preventing overheating thereof, and said heating means includes a plurality of distinct and individually actuable heating zones for independently heating designated generally distinct zones of said sheet material, said operating means being arranged for energizing said heating zones individually in a predetermined sequence upon each energizing of said heating means.

* * * * *